United States Patent
Takahashi (10) Patent No.: US 10,132,540 B2
(45) Date of Patent: Nov. 20, 2018

(54) MOTOR OPERATED VALVE APPARATUS AND MOTOR OPERATED VALVE CONTROLLER

(71) Applicant: TGK CO., LTD., Tokyo (JP)

(72) Inventor: Kazushi Takahashi, Tokyo (JP)

(73) Assignee: TGK CO., LTD, Tokyo (JP)

(*) Notice: Subject to any disclaimer, the term of this patent is extended or adjusted under 35 U.S.C. 154(b) by 267 days.

(21) Appl. No.: 15/132,694

(22) Filed: Apr. 19, 2016

(65) Prior Publication Data

US 2016/0313037 A1 Oct. 27, 2016

(30) Foreign Application Priority Data

Apr. 27, 2015 (JP) ................. 2015-090899

(51) Int. Cl.
| | |
|---|---|
| *F25B 41/06* | (2006.01) |
| *H02P 8/26* | (2006.01) |
| *H02P 8/30* | (2006.01) |
| *H02P 8/04* | (2006.01) |
| *F16K 31/50* | (2006.01) |
| *F16K 31/04* | (2006.01) |
| *F25B 49/02* | (2006.01) |

(52) U.S. Cl.
CPC ............ *F25B 41/062* (2013.01); *F16K 31/04* (2013.01); *F16K 31/50* (2013.01); *H02P 8/04* (2013.01); *H02P 8/26* (2013.01); *H02P 8/30* (2013.01); *F25B 49/02* (2013.01); *F25B 2341/0653* (2013.01); *F25B 2600/2513* (2013.01); *F25B 2700/197* (2013.01); *F25B 2700/21175* (2013.01); *Y02B 30/72* (2013.01)

(58) Field of Classification Search
CPC ....................... F25B 2600/2513; F25B 41/062
USPC ......................................... 236/92 B
See application file for complete search history.

(56) References Cited

U.S. PATENT DOCUMENTS

| | | | | |
|---|---|---|---|---|
| 4,556,193 | A | * 12/1985 | Yoshiga | .................. F16K 31/04 251/129.11 |
| 4,602,197 | A | * 7/1986 | Mattson | .................... H02P 8/26 318/685 |
| 4,691,153 | A | * 9/1987 | Nishimura | ................ H02P 8/26 318/685 |

(Continued)

FOREIGN PATENT DOCUMENTS

| | | | |
|---|---|---|---|
| JP | 2012-149857 | 8/2012 | ............ F16K 31/06 |
| JP | 2014-196810 | 10/2014 | ............ F16K 31/06 |

*Primary Examiner* — Henry Crenshaw
(74) *Attorney, Agent, or Firm* — Martine Penilla Group, LLP (57) ABSTRACT

A motor operated valve apparatus includes: a motor driven valve; a drive unit configured to drive the motor; a control unit configured to control the drive unit; and a communication unit configured to communicate with an external controller. The control unit starts control of the motor operated valve according to a command from the external controller; drives the motor in a valve closing direction at start of the control, detects a load on the motor based on a drive pulse output by the drive unit for driving the motor, and sets a driven state when the detected load reaches a predetermined reference value to be a valve switching point of a valve section; and drives the motor relative to the valve switching point of the valve section to perform control so that an opening degree of the valve section becomes a value corresponding to a control command value.

3 Claims, 4 Drawing Sheets

(56) References Cited

U.S. PATENT DOCUMENTS

| | | | | |
|---|---|---|---|---|
| 5,316,263 A | * | 5/1994 | Mino | F16K 37/0033 |
| | | | | 236/78 C |
| 5,626,030 A | * | 5/1997 | Nagai | F16K 1/54 |
| | | | | 137/599.11 |
| 6,462,503 B1 | * | 10/2002 | Narazaki | H02P 8/10 |
| | | | | 318/685 |
| 7,287,396 B2 | * | 10/2007 | Maier | F25B 41/043 |
| | | | | 236/92 B |
| 2005/0151500 A1 | * | 7/2005 | Akiyama | H02P 23/18 |
| | | | | 318/650 |
| 2012/0187202 A1 | * | 7/2012 | Suzuki | F25B 41/062 |
| | | | | 236/92 B |
| 2014/0291562 A1 | * | 10/2014 | Ooe | F16K 31/04 |
| | | | | 251/129.11 |
| 2015/0048266 A1 | * | 2/2015 | Shen | F16K 31/02 |
| | | | | 251/69 |

* cited by examiner

MOTOR OPERATED VALVE APPARATUS AND MOTOR OPERATED VALVE CONTROLLER

CLAIM OF PRIORITY

This application claims priority to Japanese Patent Application No. JP2015-090899, filed on Apr. 27, 2015, of which is incorporated herein by reference.

BACKGROUND OF THE INVENTION

1. Field of the Invention

The present invention relates to a motor driven valve and a controller therefor.

2. Description of the Related Art

A refrigeration cycle in an automotive air conditioner generally includes a compressor for compressing circulating refrigerant, a condenser for condensing the compressed refrigerant, an expansion valve for throttling and expanding the condensed liquid refrigerant and delivering the resulting spray of gas-liquid mixture refrigerant, and an evaporator for evaporating the misty refrigerant and cooling the air in a vehicle interior by evaporative latent heat. For the expansion valves, mechanical expansion valves have been widely used. Such a mechanical expansion valve senses the temperature and the pressure of refrigerant at an outlet side of the evaporator and autonomously opens and closes a valve section thereof. Alternatively, motor operated expansion valves have also been increasingly used with the recent widespread use of electric vehicles and hybrid vehicles. Motor operated expansion valves achieve accurate control of the valve opening degree by means of stepping motors as drive units.

Such a motor operated expansion valve includes a needle-like valve element, for example, for opening and closing a valve hole of a small diameter formed in a body thereof, and a motion converting mechanism configured to convert rotational movement of a rotor into translational movement of a shaft to drive the valve element (refer to Japanese Patent Application Publication No. 2014-196810, for example). The valve element is supported by an end of the shaft, and opens and closes a valve section by leaving and touching a valve seat formed at an open end of the valve hole. In order to achieve high valve element seating characteristics, some motor operated expansion valves have such a structure in which a valve element is elastically supported by a shaft and pressed against a valve seat by the elastic force so that a valve closed state is maintained.

The valve opening degree of such a motor operated valve is controlled by setting of driving steps relative to a valve switching point (a switching position between opening and closing of a valve section). The valve switching point, however, may vary from one valve to another depending on differences in size of components of the valves, assembly errors between components, or the like. Furthermore, after initiation of use (after the first use) of a motor operated valve, the valve switching point may change owing to use environment such as the influence of vibration. The valve switching point thus needs to be set in view of the differences and the change in the valve switching point due to such factors.

In view of the above, a motor operated valve in which a valve opening point is detected every preset time after staring use of the motor operated valve is proposed (refer to Japanese Patent Application Publication No. 2012-149857, for example). Specifically, the motor operated valve is opened by a predetermined opening degree every predetermined time from the fully closed position, and the valve opening degree when the temperature at an outlet of the motor operated valve has changed by a predetermined value or larger is detected to be a valve opening point (lower limit opening degree).

Related Art List (1) Japanese Patent Application Publication No. 2014-196810

(2) Japanese Patent Application Publication No. 2012-149857

With such a motor operated valve, however, since the valve opening point is detected on the basis of the temperature at the outlet of the motor operated valve, which is not directly related to the valve mechanism, the valve opening point is basically not coincident with the valve switching point mentioned above. Thus, the valve opening degree can only be set within a predictable range. Furthermore, since a method using feedback of the outlet temperature is employed, it requires time until the change in the temperature is detected, and control cannot be started readily after activation of the motor operated valve. In view of the fact that the wear of the valve seat progresses each time the valve closure is repeated, which results in a change in the valve switching point, the valve opening point detection needs to be conducted sufficiently frequently. It is therefore desirable to minimize the time required for the detection. Such problems do not occur exclusively in the motor operated expansion valves described above but also occurs similarly in motor operated valves that are different in the valve switching point from one another or whose valve switching points change with time.

SUMMARY OF THE INVENTION

One purpose of the present invention is to quickly detect a valve switching point to achieve efficient and accurate control of a motor driven valve.

One embodiment of the present invention relates to a motor operated valve apparatus. The motor operated valve apparatus includes: a motor operated valve driven by a motor; a drive unit configured to drive the motor; a control unit configured to control the drive unit; and a communication unit configured to communicate with an external controller. The control unit is configured to: start control of the motor operated valve according to a command from the external controller; drive the motor in a valve closing direction at start of control of the motor operated valve, detect a load on the motor based on a drive pulse output by the drive unit for driving the motor, and set a driven state when the detected load reaches a predetermined reference value to be a valve switching point of a valve section; and drive the motor relative to the valve switching point of the valve section to perform control so that an opening degree of the valve section becomes a value corresponding to a control command value.

According to this embodiment, the load on the motor is detected from the drive pulse when the motor is driven in the valve closing direction, and the valve switching point is set on the basis of the load. Specifically, the valve switching point is detected on the basis of a change in the motor load due to the seating operation of the valve mechanism, which allows the valve switching point to be accurately set. Furthermore, only with the valve closing operation, the valve switching point can be quickly detected. This achieves highly efficient and accurate control.

Another embodiment of the present invention relates to a motor operated valve controller. The motor operated valve controller include: a communication unit configured to communicate with an external controller, a drive unit configured to drive a motor of a motor operated valve; and a control unit configured to control the drive unit. The control unit is configured to: start control of the motor operated valve according to a command from the external controller; drive the motor in a valve closing direction at start of control of the motor operated valve, detect a load on the motor based on a drive pulse output by the drive unit for driving the motor, and set a driven state when the detected load reaches a predetermined reference value to be a valve switching point of a valve section; and drive the motor relative to the valve switching point of the valve section to perform control so that an opening degree of the valve section becomes a value corresponding to a control command value.

According to this embodiment, the load on the motor is detected from the drive pulse when the motor is driven in the valve closing direction, and the valve switching point is set on the basis of the load. Specifically, the valve switching point is detected on the basis of a change in the motor load due to the seating operation of the valve mechanism, which allows the valve switching point to be accurately set. Furthermore, the valve switching point can be detected on the basis of a signal output from the motor operated valve controller itself. This achieves highly efficient and accurate control.

DETAILED DESCRIPTION OF THE INVENTION

The invention will now be described by reference to the preferred embodiments. This does not intend to limit the scope of the present invention, but to exemplify the invention.

An embodiment of the present invention will now be described in detail with reference to the accompanying drawings. In the following description, for convenience of description, the positional relationship in each structure may be expressed with reference to how each structure is depicted in the drawings.

Figure 1:
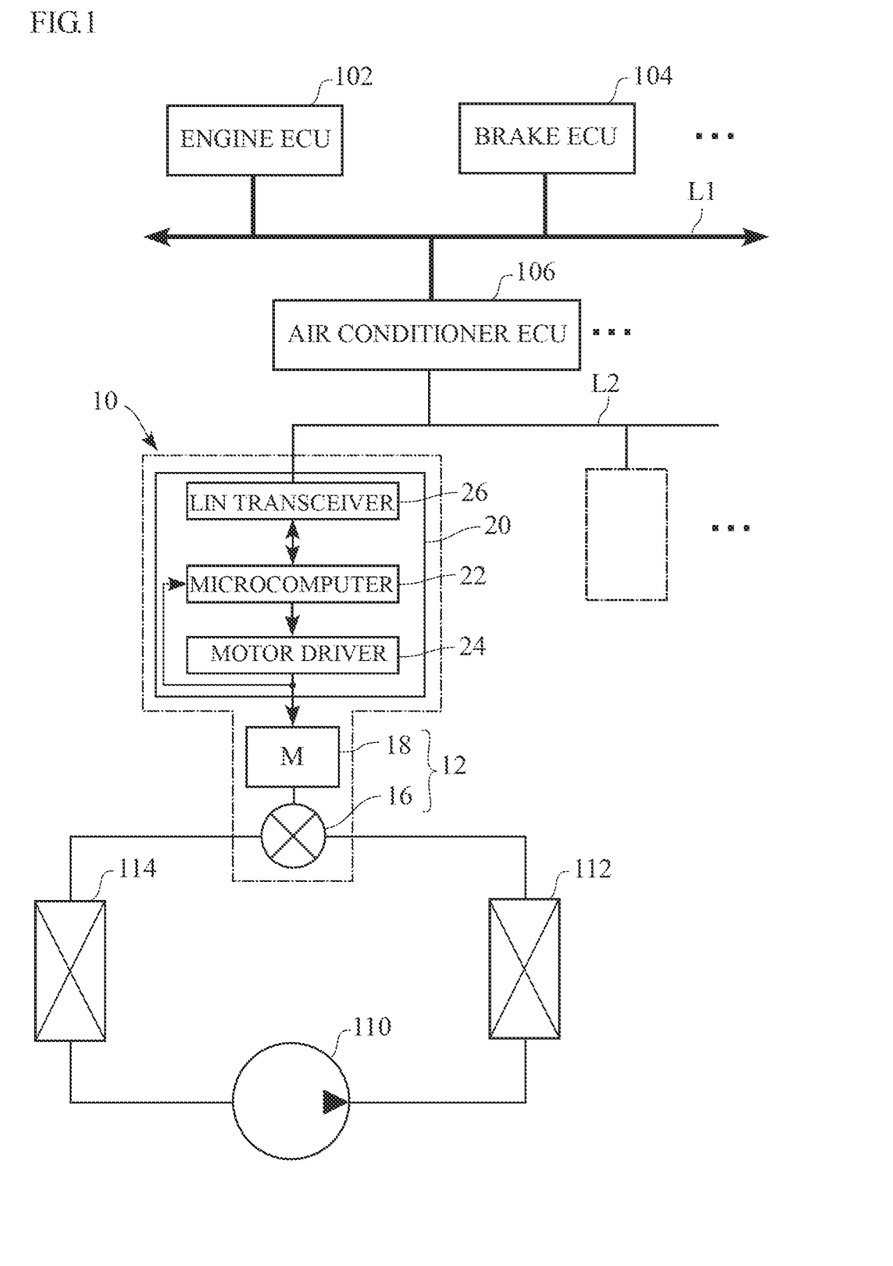
FIG. 1 is a diagram illustrating a system to which a motor operated valve apparatus according to an embodiment is applicable.

FIG. 1 is a diagram illustrating a system to which a motor operated valve apparatus according to an embodiment is applicable.

A motor operated valve apparatus 10 is applicable to an air conditioning system, which is part of a vehicle control system. The motor operated valve apparatus 10 is formed by an integral assembly of a motor operated valve 12, which functions as an expansion valve in a refrigeration cycle, and a motor operated valve controller 20 for controlling the motor operated valve 12.

The vehicle control system includes multiple electronic control units (hereinafter referred to as "ECUs") for controlling various systems therein. The ECUs are connected via an in-vehicle network. As illustrated, an engine ECU 102 for controlling an engine, a brake ECU 104 for controlling a brake system, an air conditioner ECU 106 for controlling an air conditioner, and other ECUs are connected via a communication line L1. The air conditioner ECU 106 is connected to controllers for devices included in the air conditioning system via a communication line L2. The motor operated valve controller 20 is one of such controllers.

In the present embodiment, the communication line L1 in a main network is constituted by a CAN bus, while the communication line L2 in a sub-network is constituted by a LIN bus. In other words, CAN (Controller Area Network) is employed as the communication protocol for the main network, while LIN (Local Interconnect Network) is employed as a communication protocol for the sub-network. The air conditioner ECU 106 operates as a master node connected to the LIN bus. The motor operated valve controller 20 operates as a slave node connected to the LIN bus. In a modification, CAN may be employed for both of the main network and the sub-network. Alternatively, a communication protocol other than CAN and LIN may be employed for at least one of the main network and the sub-network. Specifically, various standards such as CAN, LIN, FlexRay (registered trademark), and MOST (registered trademark) may be employed as a communication protocol for the in-vehicle network.

The refrigeration cycle includes a compressor 110 for compressing a circulating refrigerant, a condenser 112 for condensing the compressed refrigerant, an expansion valve (motor operated valve 12) for throttling and expanding the condensed liquid refrigerant and delivering the resulting spray of gas-liquid mixture refrigerant, and an evaporator 114 for evaporating the misty refrigerant to cool the air in a vehicle interior by evaporative latent heat.

The motor operated valve 12 includes a valve unit 16 and a motor unit 18, which will be described later. The motor operated valve controller 20 mainly includes a microcomputer 22 (functioning as a "control unit"), and also includes a motor driver 24 for driving the motor unit 18, and an LIN transceiver 26 (which functions as a "communication unit"). The microcomputer 22 includes a CPU configured to execute various types of arithmetic processing, a ROM configured to store control programs for a stepping motor and the like, a RAM to be used as a work area for storing data and executing programs, a nonvolatile memory (such as an EEPROM) configured to retain stored data even after power-off, an input/output interface, a communication interface, a timer, and the like.

The air conditioner ECU 106 computes a target opening degree of the motor operated valve 12 so that the degree of superheat at an outlet of the evaporator 114 becomes a set value on the basis of information detected by a temperature sensor or a pressure sensor disposed at the outlet of the evaporator 114, for example. The air conditioner ECU 106 then sends the computation result as a control command value to the motor operated valve controller 20.

The motor operated valve controller 20 receives a control command signal from the air conditioner ECU 106 via the LIN transceiver 26. The microcomputer 22 sets a control quantity (the number of driving steps of the stepping motor) for achieving the target opening degree on the basis of the control command signal, and outputs a drive signal (drive pulse) for achieving the control quantity to the motor driver 24. The motor driver 24 supplies a drive current (current pulse) to the motor unit 18 on the basis of the drive signal to rotate the stepping motor.

Figure 2:
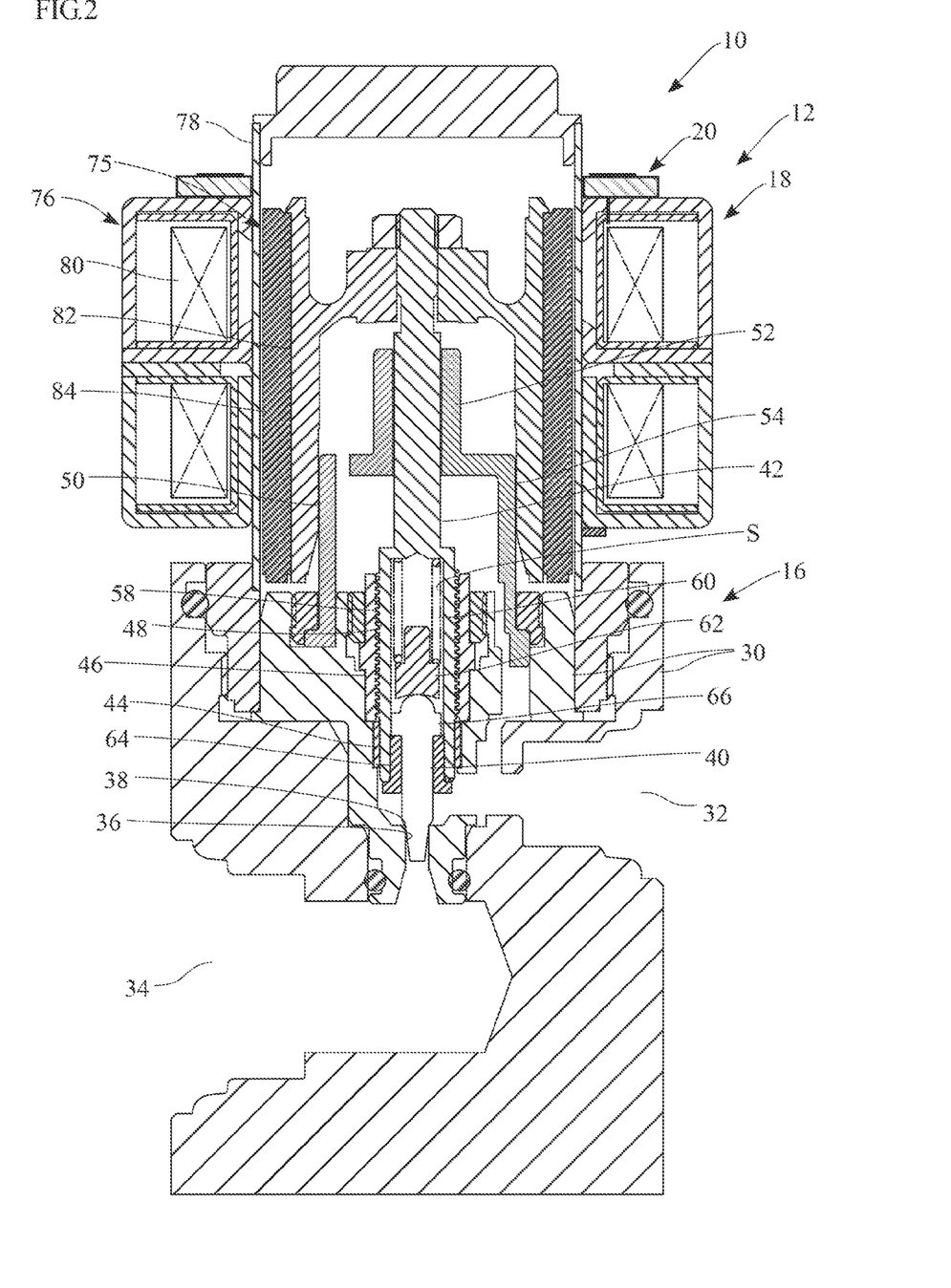
FIG. 2 is a cross-sectional view illustrating a configuration of the motor operated valve apparatus.

FIG. 2 is a cross-sectional view illustrating a configuration of the motor operated valve apparatus.

The motor operated valve apparatus 10 is formed by mounting the motor operated valve controller 20 onto the motor operated valve 12. The motor operated valve 12 is a stepping motor driven expansion valve, which is formed by an assembly of the valve unit 16 and the motor unit 18. The valve unit 16 has a body 30 containing a valve section. The motor unit 18 is mounted in such a manner as to seal an upper end opening of the body 30. The motor operated valve controller 20 has modules such as the microcomputer 22, the motor driver 24, and the LIN transceiver 26 mounted on a disc-shaped board, and is attached on the top of the motor unit 18. The modules are connected via wiring (signal lines) on the board.

An inlet port 32 through which a refrigerant is introduced from the upstream side is formed in one lateral surface of the body 30, and an outlet port 34 through which the refrigerant is delivered to the downstream side is formed in a lateral surface opposite thereto. A valve hole 36 is formed in a passage connecting the inlet port 32 and the outlet port 34, and a valve seat 38 is formed at an upper end opening of the valve hole 36. A shaft 42 extending from a rotor 75 of the motor unit 18 coaxially therewith is inserted inside the body 30. The shaft 42 supports a needle-like valve element 40 at an end thereof. The valve element 40 touches and leaves the valve seat 38 from the upstream side to close and open the valve section.

A cylindrical sliding bearing 44 is press-fitted in an upper portion in the axial direction of the body 30, and a cylindrical guide member 46 is press-fitted in a portion immediately above the sliding bearing 44. An internal thread 48 is formed on an inner surface of the guide member 46. A stepped cylindrical shaft support member 50 is disposed upright on a top surface of the body 30. The shaft support member 50 has an upper half part constituting a small dimeter part 52, and a lower half part constituting a large diameter part 54

The shaft 42 has a cylindrical lower half part with a large diameter, and has a external thread 58 formed on an outer surface thereof. The external thread 58 is engaged with the internal thread 48 of the guide member 46. The external thread 58 and the internal thread 48 are lead screws for displacing the shaft 42 relative to the body 30 in the axial direction, and constituted a "screw mechanism", which will be described later.

A hollow space S, which is open downward (that is, at a leading end of the shaft 42), is formed in the lower half part of the shaft 42. The hollow space S contains a spring 60 (functioning as a "biasing member" constituting a "biasing structure"), a spring holder 62, and the valve element 40 in this order from the top. A cylindrical bush 64 is concentrically press-fitted into the lower end opening of the shaft 42, and slidably supports the valve element 40 from below. The bush 64 functions as a "support part". Since the shaft 42 and the bush 64 are integrated, the shaft 42 and the bush 64 can collectively be regarded as a "shaft" in a broad sense. A lower end opening of the bush 64 constitutes the "leading end opening" of the shaft.

The valve element 40 is disposed through the bush 64, and has a flange part 66 protruding radially outward from an upper end portion thereof. A lower surface of the flange part 66 is stopped by a top surface of the bush 64, so that valve element 40 is prevented from dropping off downward.

The spring holder 62 transmits a downward biasing force (in a valve closing direction) of the spring 60 to the valve element 40. The upper end of the valve element 40 has a convex spherical surface of a hemispherical shape, and a bottom surface of the spring holder 62 is a concave spherical surface. The valve element 40 and the spring holder 62 are in contact with each other at the spherical surfaces thereof. With this configuration, the axes of the valve element 40 and the spring holder 62 are less likely to be misaligned, and even if these axes are misaligned, the valve element 40 and the spring holder 62 make alignment action with each other.

The motor unit 18 is a stepping motor including the rotor 75 and a stator coil 76. The motor unit 18 includes a can 78 having a bottomed cylindrical shape, the rotor 75 is disposed inside the can 78, and the stator coil 76 is disposed outside the can 78. The can 78 is a cylindrical member covering a space in which the valve element 40 and a mechanism for driving the valve element 40 are disposed and containing the rotor 75. The can 78 defines an internal pressure-acting space in which the pressure of the refrigerant acts, and an external non-pressure-acting space in which the pressure of the refrigerant does not act. A lower end opening of the can 78 is mounted on the top of the body 30.

The stator coil 76 contains an exciting coil 80, and is disposed around the can 78. The stator coil 76 is fixed to the body 30. The exciting coil 80 is connected to the motor driver 24 of the motor operated valve controller 20. The rotor 75 includes a cylindrical rotor core 82 coaxial with the shaft 42, and a magnet 84 disposed along the circumference of the rotor core 82. An upper end portion of the rotor core 82 extends radially inward and is fixed to an upper end portion of the shaft 42. The shaft 42, which is a rotational shaft of the rotor 75, is supported at two points by the small diameter part 52 of the shaft support member 50 and the sliding bearing 44. The large diameter part 54 of the shaft support member 50 has an outer diameter substantially equal to the inner diameter of the rotor 75, so that whirling of the rotor 75 can be prevented or reduced.

The valve opening degree of motor operated valve 12 having the configuration as described above is adjusted by drive control of the motor unit 18. In flow rate control using the motor operated valve 12, the microcomputer 22 computes the number of driving steps of the stepping motor according to a set opening degree, and outputs a drive signal (drive pulse) corresponding to the driving steps to the motor driver 24. The motor driver 24 supplies a drive current (drive pulse) to the exciting coil 80 on the basis of the drive signal. This causes the rotor 75 to rotate, and the shaft 42 also rotates therewith. In this process, the shaft 42 makes a translational movement in the vertical direction, that is, in the opening and closing directions of the valve section by a screw mechanism (lead screws) between the shaft 42 and the guide member 46, to adjust the opening degree of the valve section to the set opening degree. The screw mechanism thus functions as a "motion converting mechanism" that drives the valve element 40 in the opening and closing directions of the valve section by converting rotational movement of the rotor 75 about the axis into translational movement (linear movement) of the shaft 42 in the axial direction.

When the rotor 75 is rotated in one direction (normal rotation) from the valve closed state illustrated in FIG. 2, the valve element 40 acts in the valve opening direction. Specifically, the shaft 42 rotating with the rotor 75 is moved upward by the screw mechanism, and the bush 64 displaces the valve element 40 in the valve opening direction in such a manner that the bush 64 pulls the valve element 40 upward.

As the rotor 75 is rotated in one direction, the opening degree of the valve section increases.

When the rotor 75 is rotated in the other direction (opposite direction) (reverse rotation), the opening degree of the valve section decreases. Specifically, the shaft 42 reversely rotating with the rotor 75 is moved downward by the screw mechanism, and the valve element 40 is displaced in the valve closing direction in a state supported by the bush 64. In this process, since the biasing force of the spring 60 is transmitted to the valve element 40 via the spring holder 62, the valve element 40 is stably displaced integrally with the bush 64. As a result, the valve element 40 is displaced in the valve closing direction and touches the valve seat 38 to be in the valve closed state.

Since the number of rotations of the rotor 75 corresponds to the number of driving steps, the microcomputer 22 can control the motor operated valve 12 at any opening degree by setting the number of driving steps. A liquid refrigerant introduced into the motor operated valve 12 from the condenser side through the inlet port 32 is throttled and expanded (adiabatically expanded) to become a spray of a gas-liquid mixture refrigerant as the refrigerant passes through the valve section, and delivered through the outlet port 34 toward the evaporator.

Next, a control method of the motor operated valve apparatus will be explained.

As described above, the opening degree of the motor operated valve 12 is set according to the number of driving steps based on the control command value. The opening degree is set relative to a valve switching point. Note that the "valve switching point" refers to a point where the valve section is switched from the valve closed state to the valve open state and also where the valve section is switched from the valve open state to the valve closed state (that is, a boundary point between the valve open state and the valve closed state). The valve opening degree can be set with use of the number of driving steps in the valve opening direction relative to the valve switching point.

As described above, however, even when the valve element 40 touches the valve seat 38 in the process of valve closure, the driving of the shaft 42 is not immediately stopped, but the shaft 42 and thus the rotor 75 is stopped at a position where the spring 60 is slightly compressed. More specifically, during a period after the valve element 40 touches the valve seat 38 and until the shaft 42 reaches the lowest point (a period of ⅓ to one rotation after the valve element 40 touching the valve seat 38, for example), the rotation of the shaft 42 continues while the spring 60 is being compressed. In this manner, the biasing force of the spring 60 presses the valve element 40 against valve seat 38, so that a stable valve closed state is maintained.

With the configuration as described above, the stop point of the valve element 40 is not coincident with the stop point of the shaft 42. Thus, in the valve closing operation, control of a given number of steps is present between the timing at which the valve element 40 touches the valve seat 38 and the timing at which the shaft 42 stops. Similarly, in the valve opening operation, control of a given number of steps is also present between the timing at which driving of the shaft 42 is started and the timing at which the valve element 40 leaves the valve seat 38. Since it is the shaft 42 that is directly driven by the stepping motor, the number of driving steps as the control command value is set relative to the stop point of the shaft 42. In other words, the stop point of the shaft 42 set for achieving a stable valve closed state is defined as an origin of the driving steps, and a valve opening degree command value is set in view of the number of driving steps from the origin to the valve switching point. The origin is a reference position for counting the driving steps of the stepping motor, and also a reference position in driving the shaft 42.

During the valve closing operation, since the valve element 40 is disengaged from the bush 64 at the same time as touching the valve seat 38, no excessive force acts between the valve element 40 and the valve seat 38. Since, however, friction is caused between the valve element 40 and the valve seat 38 when the valve element 40 touches the valve seat 38, the wear of the valve seat 38 progresses each time the valve closure is repeated. In particular, the initial wear rate of the valve seat 38 immediately after installation of the motor operated valve apparatus 10, that is, at the initial stage of use of the motor operated valve 12 tends to be high. A good performance in controlling the valve opening degree, however, needs to be maintained even with such wear. In view of this, an initial process of updating the aforementioned origin of the driving steps each time driving of the motor operated valve 12 is started (a so-called origin seeking) is performed in the present embodiment.

The origin seeking is performed by causing the motor operated valve 12 to close and detecting a load on the stepping motor during this process. Specifically, when the shaft 42 is driven in the valve closing direction and the valve element 40 thus touches the valve seat 38, a force reactive thereto changes the load torque of the rotor 75. This in turn changes the waveform of the drive current supplied from the motor driver 24 to the motor unit 18. Detection of this change allows determination that the valve switching point has been reached.

More specifically, the origin seeking is as follows, for example. The current waveform monitored when the stepping motor is driven is a waveform obtained by combination of a drive current supplied in each step and an induced current caused by displacement in each step. This waveform changes relatively greatly between before and after valve closure. This is because the waveform reflects the fact that the load torque of the rotor 75 increases when the valve element 40 touches the valve seat 38, which prevents or reduces unsteady motion of the rotor 75 in the rotational direction in each step. The point where the valve element 40 touches the valve seat 38, that is, the valve switching point can be determined by detecting that the amount of change of the waveform has reached a predetermined reference value.

The valve closing operation is then continued for a predetermined number of driving steps (the number of steps set for maintaining the valve closed state) from the valve switching point. When the predetermined number of steps is reached, the driving of the motor unit 18 is stopped, and the stop point is set as the origin of the driving steps. Such a process is performed each time driving of the motor operated valve 12 is started, so that the contact force between the valve element 40 and the valve seat 38 (the biasing force of the spring 60 in the valve closing direction) in the valve closed state can be kept substantially constant regardless of the wear condition of the valve section. As a result, a good performance in controlling the valve opening degree is maintained.

Figure 3:
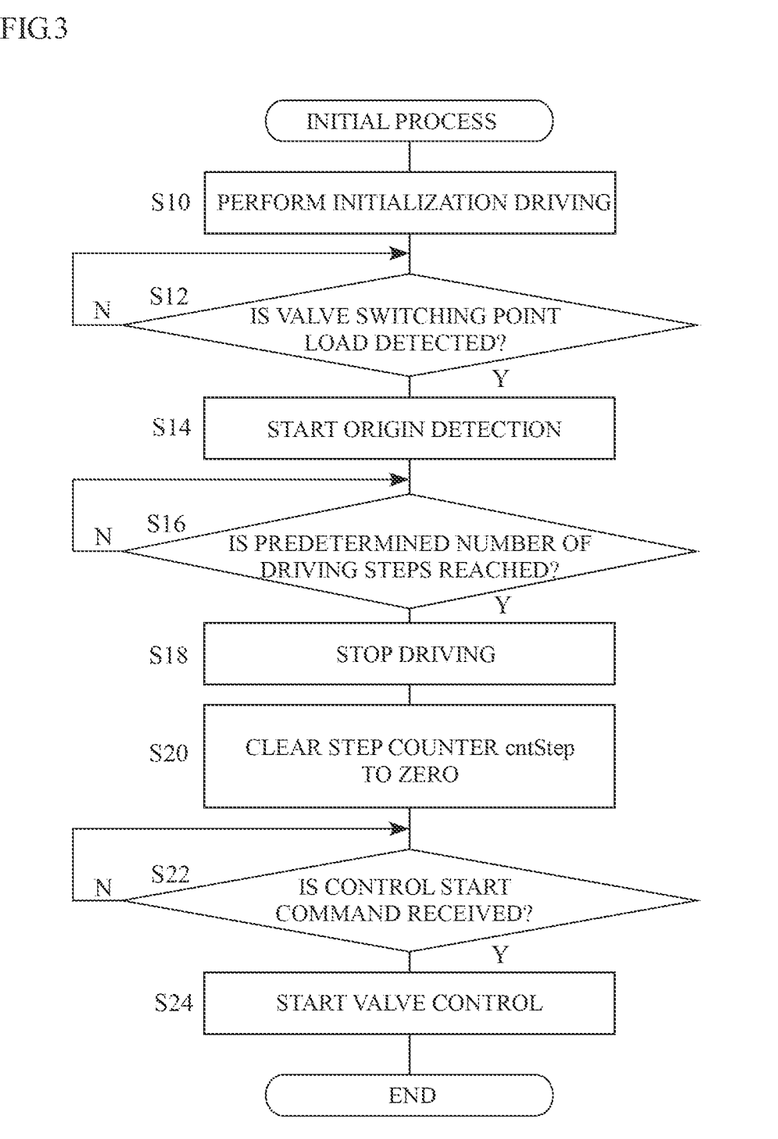
FIG. 3 is a flowchart showing a sequence of operations in an initial process.

Next, a sequence of specific processes performed by the control unit (microcomputer 22) of the motor operated valve apparatus 10 will be explained. FIG. 3 is a flowchart showing a sequence of operations in the initial process performed by the control unit. This process is performed each time the motor operated valve apparatus 10 is activated.

The control unit first performs initialization driving to move the shaft 42 to the lowest point so as to determine the origin of the driving steps (S10). When a load indicating the valve switching point (also referred to as a "valve switching point load") is detected (Y in S12), the control unit starts a detection process for origin seeking (S14). Specifically, the control unit counts the number of driving steps in the valve closing direction after detection of the valve switching point load. In this process, when the number of driving steps reaches a predetermined number (Y in S16), the control unit determines that the shaft 42 is driven to the position of origin and stops driving of the motor unit 18 (S18). The control unit then clears the step counter (cntStep) set in the RAM to zero (S20).

The step counter is configured to count the number of driving steps from the current origin of the driving step. The valve switching point in the current process is determined in this manner, and thus the valve switching point, which is a reference of control, is also determined. Specifically, the position where the step counter reaches the predetermined number of steps from the origin in the valve opening direction is determined to be the valve switching point. Upon receiving a control start command from the air conditioner ECU 106 (Y in S22), the control unit starts the valve control process of controlling the opening degree of the motor operated valve 12 (S24).

Figure 4:
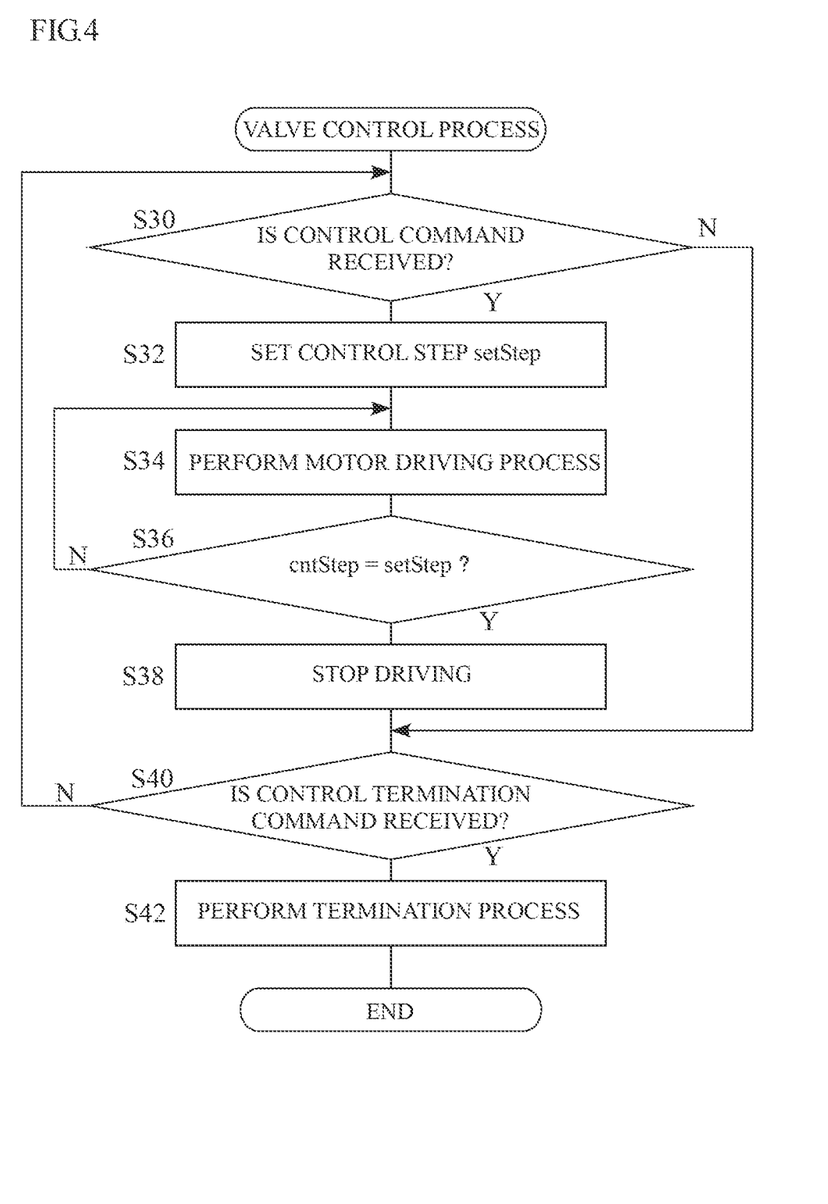
FIG. 4 is a flowchart showing a sequence of operations in a valve control process.

FIG. 4 is a flowchart showing a sequence of operations in the valve control process started in S24 of FIG. 3.

Upon receiving a control command from the air conditioner ECU 106 (Y in S30), the control unit sets a control quantity (the number of control steps setStep) for achieving a target opening degree contained in the control command (S32). Herein, whether or not the target opening degree has been reached is determined on the basis of the number of driving steps from the valve switching point. In the present embodiment, however, since the valve switching point is defined relative to the origin, the number of control steps (setStep) is set as the number of driving steps (cntStep) from the origin. The control unit then performs a stepping motor driving process (S34). The control unit continues the driving process until the valve opening degree becomes the target opening degree, that is, until the number of driving steps (cntStep) becomes the number of control steps (setStep) (N in S36). When the valve opening degree reaches the target opening degree (Y in S36), driving of the stepping motor is stopped (S38). If no control command is received (N in S30), the processing in S32 to S38 is skipped.

The control unit then repeats the processing in S30 to S38 until a control termination command is received from the air conditioner ECU 106 (N in S40). Upon receiving a control termination command (Y in S40), the control unit performs a predetermined termination process (S42) and terminates the present process.

As described above, in the present embodiment, a load on the stepping motor is detected from a drive pulse of the motor driver 24 driving the motor unit 18 in the valve closing direction, and the valve switching point is set on the basis of the load. Thus, since the valve switching point is detected on the basis of a change in the motor load due to the seating operation of the valve mechanism, the valve switching point is accurately set independently of individual differences of motor operated valves, assembly errors, a change in shape of the valve section resulting from wear, and the like. This also facilitates control for setting the valve opening degree to a small opening degree (micro flow rate control around the valve switching point) and prevents unexpected valve closure during control to a small opening degree. Furthermore, only with the valve closing operation of the motor operated valve 12, the valve switching point can be detected on the basis of a signal output from the motor operated valve controller 20 itself, which enables efficient start of the control.

The description of the present invention given above is based upon illustrative embodiments. These embodiments are intended to be illustrative only and it will be obvious to those skilled in the art that various modifications could be further developed within the technical idea underlying the present invention.

In the above-described embodiment, an example in which the valve switching point and the origin are set separately in the initial process shown in FIG. 3 has been presented. In a modification, the valve switching point itself may be used as the origin.

In the above-described embodiment, an example in which the initialization driving is performed only once to set the valve switching point and the origin in the initial process has been presented. In a modification, the initialization driving may be performed a plurality of times and the valve switching point and the origin may be set to averages of those obtained at the respective times of initialization driving. In view of the position of the motor operated expansion valve, which is relatively close to the vehicle interior, however, frequent operating noise during valve closure caused by the initialization driving is undesirable. It is therefore preferable to limit the number of times of the initialization driving to one as in the above-described embodiment.

Although not mentioned in the embodiment described above, the motor operated valve may be provided with a stopper mechanism for restricting the movement of the shaft in the valve closing direction. The stopper mechanism is provided so as to stop the shaft having moved a predetermined amount in the valve closing direction further after the valve element touched the valve seat. The state in which the shaft is stopped by the stopper mechanism may be set to be the origin, and the valve switching point may be defined by the number of driving steps in the valve opening direction from the origin. In this case, information indicating the valve switching point (the number of driving steps from the origin; also referred to as "the number of valve opening steps") may be stored in a nonvolatile memory in the initial process. In the next initial process, the shaft may then be driven for a predetermined number of steps (a small number of steps) more than the number of valve opening steps from the origin position before being stopped, and then driven in the valve closing direction for detection of the valve switching point. Such a technique allows quick and efficient detection of the valve switching point.

In the above-described embodiment, an example in which the motor operated valve controller 20 is integrally provided with the motor operated valve 12 as illustrated in FIGS. 1 and 2 has been presented. In a modification, the motor operated valve controller 20 may be mounted on a relay board and provided separately from the motor operated valve 12, for example. Furthermore, the motor operated valve controller 20 and the motor operated valve may be connected by a given signal line.

While an example in which the motor of the motor operated valve is a stepping motor has been described in the above-described embodiment, the motor may be other motors such as a DC motor.

While the motor operated valve has a structure of an expansion valve of a small diameter in the embodiment, the motor operated valve may be a control valve without an expanding function. For example, the motor operated valve may have a structure of an on-off valve or a flow control valve of a large diameter, for example.

While an example in which the needle-like valve element 40 is employed has been presented in the embodiment, the valve element may have other shapes. For example, a valve forming part having a large diameter may be provided at a leading end of the valve element 40. This allows the flow rate controlled at the valve section to be increased.

In the above-described embodiment, an example in which the shaft 42 is provided coaxially with the rotor 75 has been presented. In a modification, the rotor and the shaft may be provided along different axes from each other. For example, the axes thereof may be misaligned in parallel. In addition, a gear mechanism (reduction gear) may be disposed between the shaft and a shaft of the rotor.

In the above-described embodiment, an example in which a coil spring (spring 60) is used for the biasing structure for elastically pressing the valve element against the valve seat during valve closure. In a modification, other springs such as a disc spring or a leaf spring may be used instead of the coil spring. Alternatively, other biasing members such as rubber or a diaphragm may be used. Still alternatively, other biasing structures such as a structure in which the valve seat is made thinner to elastically receive the valve element (a structure in which the valve seat is made elastic), for example. In such a case, a structure in which the valve element is not elastically supported by the shaft may be used. For example, the shaft and the valve element may be integrated.

Although the motor operated valve according to the above-described embodiment is suitably applicable to a refrigeration cycle in which an alternative for chlorofluorocarbon (HFC-134a) or the like is used as the refrigerant, the motor operated valve can also be applied to a refrigeration cycle in which a refrigerant such as carbon dioxide with high working pressure is used. In this case, an external heat exchanger such as a gas cooler is provided instead of the condenser in the refrigeration cycle.

The present invention is not limited to the above-described embodiments and modifications only, and those components may be further modified to arrive at various other embodiments without departing from the scope of the invention. Also, various other embodiments may be further formed by combining, as appropriate, a plurality of structural components disclosed in the above-described embodiments and modification. Also, one or some of all of the components exemplified in the above-described embodiments and modifications may be left unused or removed.

What is claimed is:

1. A motor operated valve apparatus comprising:
   a motor operated valve driven by a motor;
   a drive unit configured to drive the motor;
   a control unit configured to control the drive unit; and
   a communication unit configured to communicate with an external controller,
   wherein the control unit is configured to:
      start control of the motor operated valve according to a command from the external controller;
      drive the motor in a valve closing direction at start of control of the motor operated valve, detect a load on the motor based on a drive pulse output by the drive unit for driving the motor, and set a driven state when the detected load reaches a predetermined reference value to be a valve switching point of a valve section; and
      drive the motor relative to the valve switching point of the valve section to perform control so that an opening degree of the valve section becomes a value corresponding to a control command value;
   wherein the motor operated valve includes,
   a body having an inlet port through which fluid is introduced from an upstream side, an outlet port through which fluid is delivered to a downstream side, and a valve hole through which the inlet port and the outlet port communicate with each other;
   a valve element configured to open and close the valve section by moving away from and toward a valve seat formed at an open end of the valve hole;
   the motor being a stepping motor including a rotor for driving the valve element;
   a shaft configured to rotate with the rotor and support the valve element at an end portion thereof;
   a biasing structure for elastically pressing the valve element against the valve seat during valve closure; and
   a motion converting mechanism configured to convert rotational movement of the rotor into translational movement of the shaft;
   wherein the control unit stops the shaft when the shaft has further moved a predetermined number of steps in the valve closing direction after the valve element touched the valve seat, and
   wherein the valve switching point is defined by the number of driving steps in a valve opening direction from an origin, the origin being a position at which the shaft is stopped.

2. A motor operated valve apparatus according to claim 1, wherein the motor operated valve, the drive unit, the control unit, and the communication unit are integrally provided.

3. A motor operated valve apparatus according to claim 1, wherein the motor operated valve is a motor operated expansion valve applicable to a refrigeration cycle in an automotive air conditioner.

* * * * *